(12) United States Patent
Ishikawa

(10) Patent No.: US 10,085,390 B2
(45) Date of Patent: Oct. 2, 2018

(54) BACKPACK TYPE BLOWING APPARATUS

(71) Applicant: MARUYAMA MFG. CO., INC., Tokyo (JP)

(72) Inventor: Yoichi Ishikawa, Tokyo (JP)

(73) Assignee: MARUYAMA MFG. CO., INC., Tokyo (JP)

( * ) Notice: Subject to any disclaimer, the term of this patent is extended or adjusted under 35 U.S.C. 154(b) by 86 days.

(21) Appl. No.: 15/441,233

(22) Filed: Feb. 23, 2017

(65) Prior Publication Data

US 2017/0238471 A1    Aug. 24, 2017

(30) Foreign Application Priority Data

Feb. 24, 2016    (JP) .................................. 2016-032887

(51) Int. Cl.
| | |
|---|---|
| *E01H 1/08* | (2006.01) |
| *F02M 35/10* | (2006.01) |
| *F04D 29/42* | (2006.01) |
| *F02B 63/06* | (2006.01) |
| *F02M 35/02* | (2006.01) |
| *A01G 20/43* | (2018.01) |

(52) U.S. Cl.
CPC .......... *A01G 20/43* (2018.02); *E01H 1/0809* (2013.01); *F02B 63/06* (2013.01); *F02M 35/0204* (2013.01); *F02M 35/1017* (2013.01); *F02M 35/10196* (2013.01); *F04D 29/4226* (2013.01); *E01H 2001/0881* (2013.01)

(58) Field of Classification Search
CPC .................. A01G 20/43; E01H 1/0809; E01H 2001/0881; F02B 63/06; F02M 35/0204; F02M 35/1017; F02M 35/10196
See application file for complete search history.

(56) References Cited

U.S. PATENT DOCUMENTS

| | | | | | |
|---|---|---|---|---|---|
| 5,052,073 | A | * | 10/1991 | Iida ......................... | F16M 3/00 |
| | | | | | 15/327.5 |
| 5,857,439 | A | * | 1/1999 | Will ......................... | A47L 5/36 |
| | | | | | 123/184.21 |
| 6,994,070 | B2 | * | 2/2006 | Taomo ..................... | A47L 5/14 |
| | | | | | 123/198 E |

(Continued)

FOREIGN PATENT DOCUMENTS

| | | |
|---|---|---|
| JP | H0399021 U | 10/1991 |
| JP | H0512652 U | 2/1993 |

(Continued)

OTHER PUBLICATIONS

Japanese Notice of Allowance dated May 15, 2018 for Application No. P2016-032887.

*Primary Examiner* — Dung Van Nguyen
(74) *Attorney, Agent, or Firm* — Moser Taboada

(57) ABSTRACT

A backpack type blowing apparatus includes an intake pipe that connects an air cleaner fixed to a fan case of an air blower to a carburetor that supplies an evaporated fuel to an engine body, and a top cover fixed to the fan case to cover at least the intake pipe by interposing the intake pipe between the top cover and the fan case. The top cover has a plurality of cover fixing portions fixed to the fan case. An outer circumferential-side fixed portion positioned on an outer circumferential side of the intake pipe in the fan case is included in the plurality of cover fixing portions.

4 Claims, 4 Drawing Sheets

(56) References Cited

U.S. PATENT DOCUMENTS

| | | | | |
|---|---|---|---|---|
| 9,167,751 B2* | 10/2015 | Thackery | ............... | A47L 5/36 |
| 9,192,222 B2* | 11/2015 | Nashimoto | ............ | A01G 20/43 |
| 9,206,567 B2* | 12/2015 | Kinoshita | .............. | A01G 1/125 |
| 9,538,711 B2* | 1/2017 | Mutoh | ................... | A01G 1/125 |
| 2009/0038106 A1* | 2/2009 | Wada | ................... | E01H 1/0809 |
| | | | | 15/326 |

FOREIGN PATENT DOCUMENTS

| | | |
|---|---|---|
| JP | H10317982 A | 12/1998 |
| JP | 2000073762 A | 3/2000 |
| JP | 1193123 | 12/2003 |
| JP | 2010-229950 A | 10/2010 |
| JP | 2015197019 A | 11/2015 |

\* cited by examiner

LEFT ← → RIGHT

BACKPACK TYPE BLOWING APPARATUS

CROSS-REFERENCE TO RELATED APPLICATIONS

The disclosure is based upon and claims the benefit of priority from Japanese Patent Application No. 2016-032887, filed on Feb. 24, 2016, the entire contents of which are incorporated herein by reference.

TECHNICAL FIELD

The present disclosure relates to a backpack type blowing apparatus used while being shouldered by an operator.

BACKGROUND

For example, a backpack type blowing apparatus, in which an air blower and an engine body driving the air blower are installed on a frame, used while being shouldered by an operator is disclosed in Japanese Unexamined Patent Publication No. 2010-229950. Such a backpack type blowing apparatus is used outside in many cases, and thus provided with an air cleaner such that dust, etc. does not come into the engine body. The air cleaner and a carburetor that supplies an evaporated fuel to the engine body are connected by an intake pipe.

SUMMARY

In such a backpack type blowing apparatus, an intake pipe made of resin is used in many cases. Further, the intake pipe is fixed at two positions corresponding to an inlet side and an outlet side. For this reason, the intake pipe may be damaged in response to receiving a strong impact when the intake pipe crashes into an obstacle. For this reason, it is desirable to prevent damage to the intake pipe.

The disclosure describes a backpack type blowing apparatus capable of preventing damage to an intake pipe.

One aspect of the disclosure is a backpack type blowing apparatus installed on a frame while an air blower and an engine body driving the air blower are adjacent to each other, the backpack type blowing apparatus including an intake pipe that connects an air cleaner fixed to a fan case of the air blower to a carburetor that supplies an evaporated fuel to the engine body, and a cover fixed to the fan case to cover at least the intake pipe by interposing the intake pipe between the cover and the fan case, wherein the cover has a plurality of fixed portions fixed to the fan case, and an outer circumferential-side fixed portion positioned on an outer circumferential side of the intake pipe in the fan case When viewed along an arrangement direction of the air blower and the engine body is included in the plurality of fixed portions.

In the backpack type blowing apparatus, the intake pipe is covered with the cover by interposing the intake pipe between the cover and the fan case. For this reason, it is possible to prevent the intake pipe from crashing into an obstacle, and to prevent damage to the intake pipe. In addition, the outer circumferential-side fixed portion positioned on the outer circumferential side of the intake pipe in the fan case is included in the plurality of fixed portions in the cover. In other words, the outer circumferential-side fixed portion in the cover is fixed to the fan case at a position on the outer circumferential side of the intake pipe in the fan case. For this reason, even when an external impact is applied to cover, the impact applied to the cover may be stopped at the outer circumferential-side fixed portion positioned on an outer side of the intake pipe. In this way, it is possible to strongly protect the intake pipe from an external impact, and to prevent damage to the intake pipe.

The intake pipe may have an air cleaner connecting portion connected to the air cleaner, a carburetor connecting portion connected to the carburetor, and an intermediate portion that connects the air cleaner connecting portion to the carburetor connecting portion, and a portion from a region of the intermediate portion adjacent to the outer circumferential-side fixed portion to a region on a side of the air cleaner connecting portion when viewed along the arrangement direction of the air blower and the engine body may be positioned on an inner side of an outer circumferential portion of the fan case in the fan case. In this case, since the outer circumferential portion of the fan case is positioned on an outer side, an obstacle is inhibited from crashing into the portion from the region of the intermediate portion adjacent to the outer circumferential-side fixed portion to the region on the air cleaner connecting portion side (through the cover). In this way, damage to the intake pipe may be further prevented.

A connection port connected to the intake pipe in the air cleaner may face a side of the engine body. In this case, the intake pipe may be disposed while being inhibited from passing through an outer side of the fan case when viewed along the arrangement direction of the air blower and the engine body. In this way, damage to the intake pipe may be further prevented.

The cover may further cover the engine body. In this way, the cover may be used to function both as a cover that covers a portion of the intake pipe and a cover that covers the engine body.

According to the disclosure, it is possible to prevent damage to the intake pipe.

DETAILED DESCRIPTION

Hereinafter, a description will be given of an embodiment of the disclosure with reference to drawings. In description of the drawings, the same reference symbol will be assigned to the same component, and a repeated description will be omitted. In description below, terms "up and down", "front and rear", and "right and left" represent directions with respect to an operator shouldering a backpack type blowing apparatus.

Figure 1:
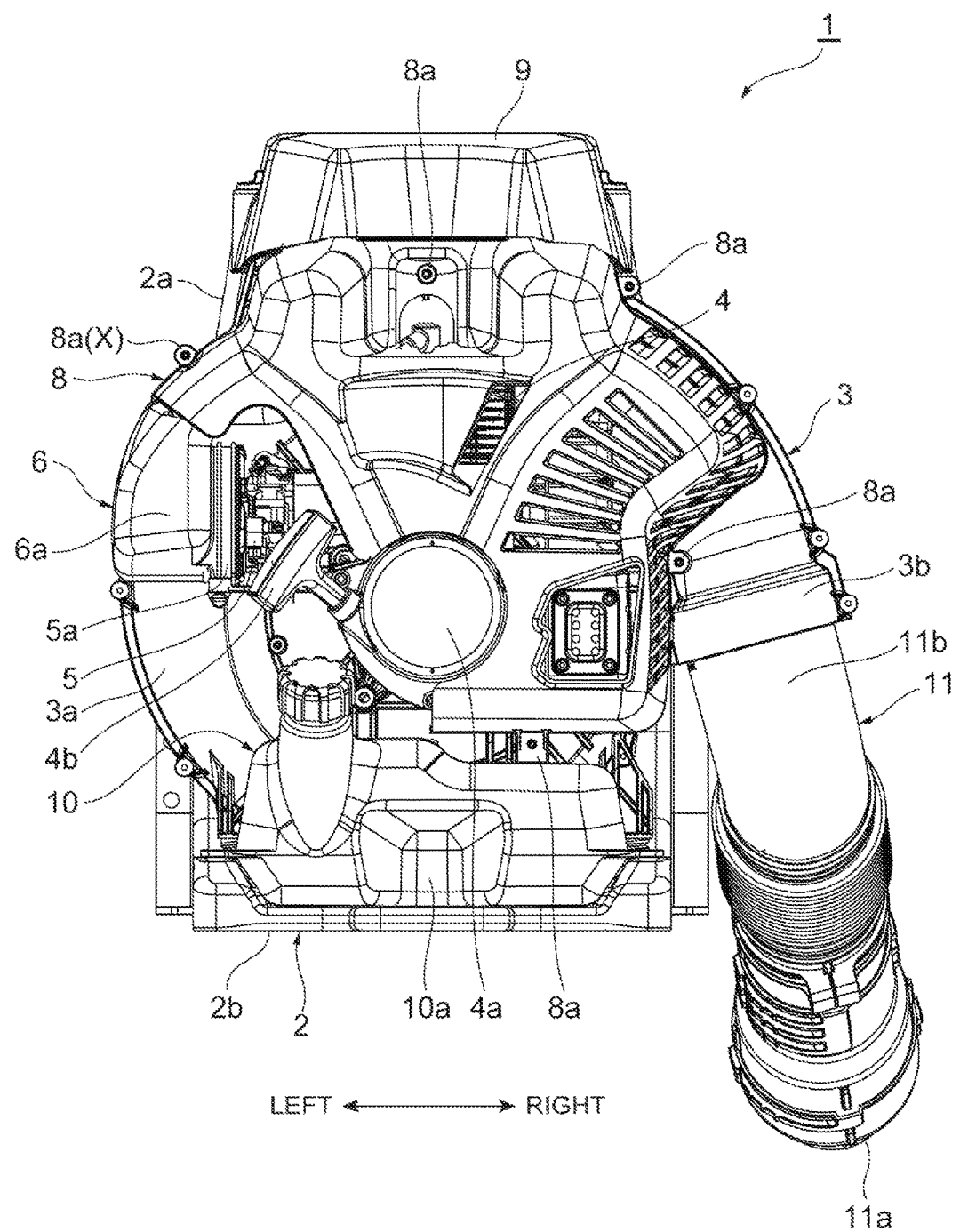
FIG. 1 is a diagram illustrating a backpack type blowing apparatus according to the disclosure when viewed from a rear side.
Figure 2:
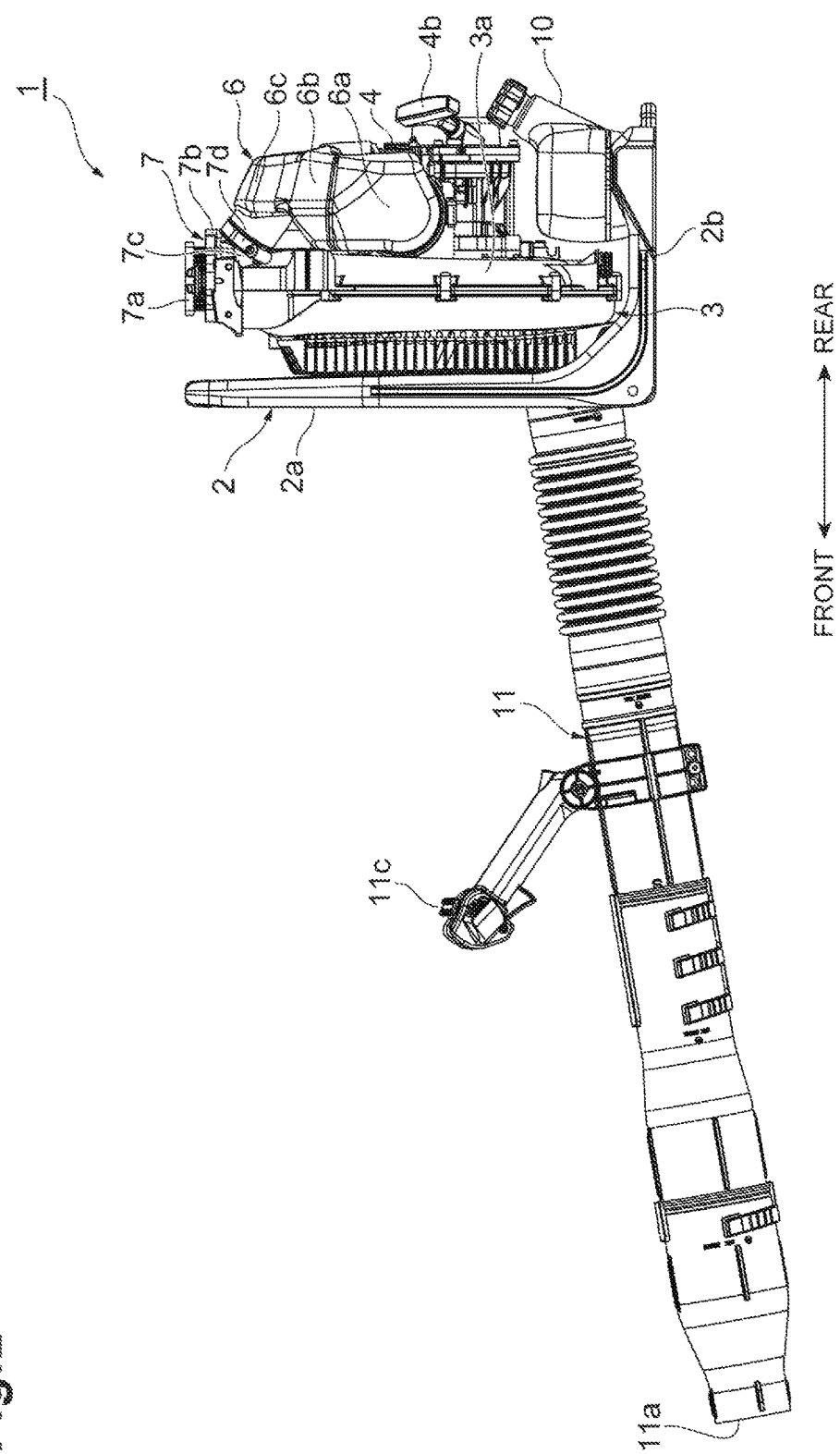
FIG. 2 is a diagram illustrating the backpack type blowing apparatus when viewed from a left side.
Figure 3:
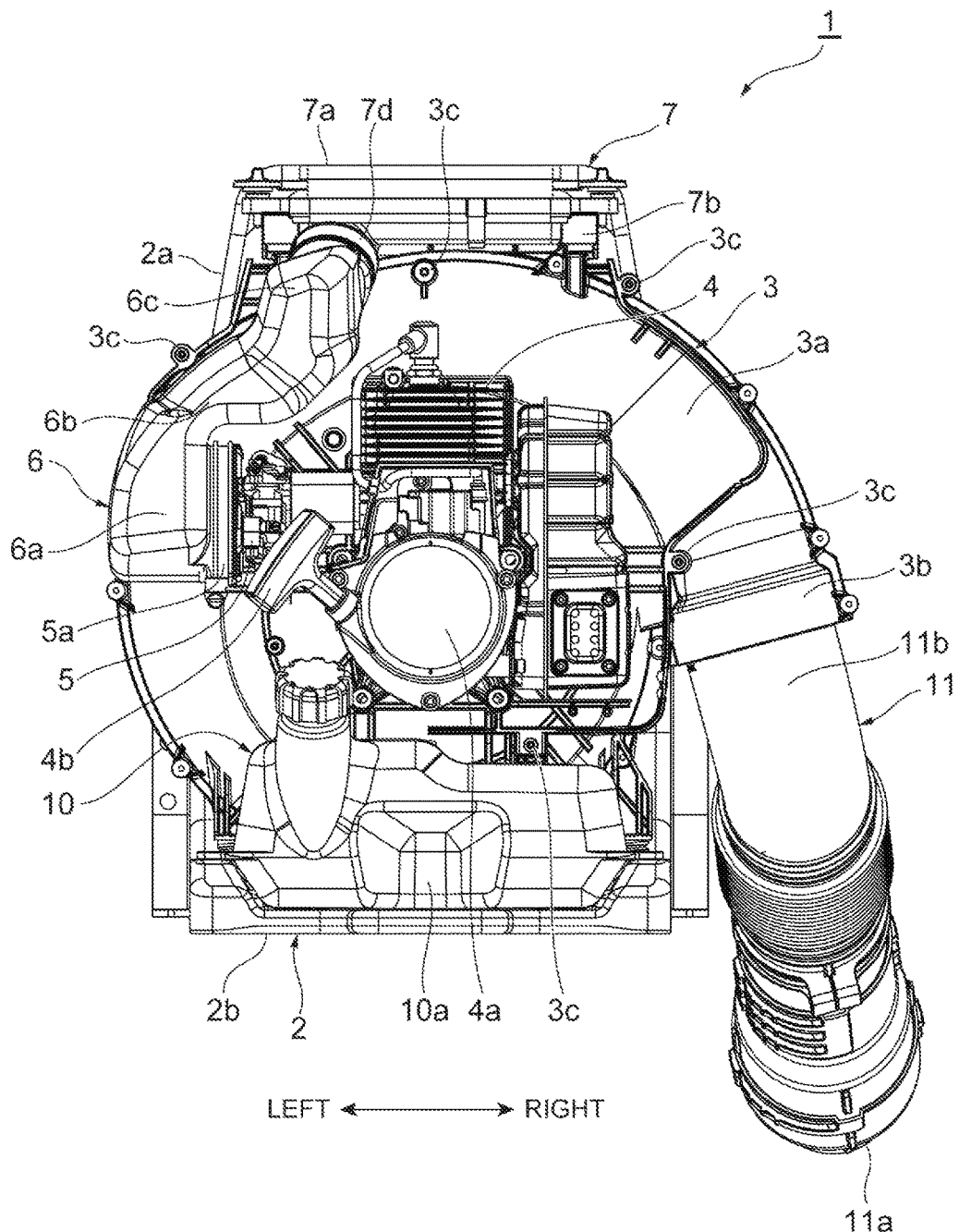
FIG. 3 is a diagram illustrating the backpack type blowing apparatus in a state in which a top cover and a cleaner cover are removed when viewed from the rear side.
Figure 4:
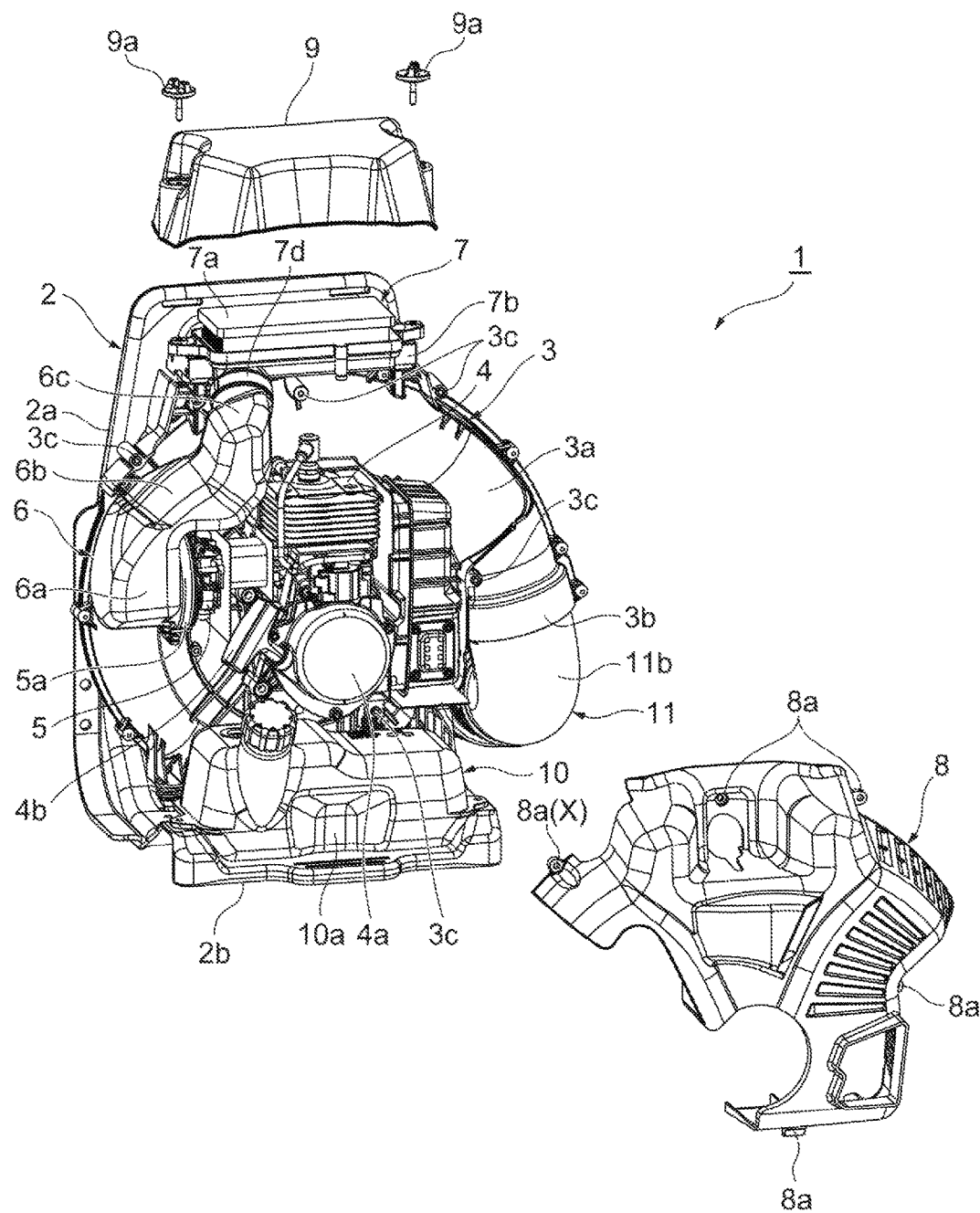
FIG. 4 is a diagram illustrating a state in which the top cover and the cleaner cover are attached.

As illustrated in FIG. 1 to FIG. 4, the backpack type blowing apparatus 1 includes a frame 2, an air blower 3, an engine body 4, a carburetor 5, an intake pipe 6, an air cleaner 7, a top cover (cover) 8, an air cleaner cover 9, a fuel tank 10, and a blast pipe 11. FIG. 2 and FIG. 3 illustrate a state in which the top cover 8 and the air cleaner cover 9 are removed to illustrate an internal structure of the backpack type blowing apparatus 1. In addition, FIG. 4 illustrates a state in which the top cover 8 and the air cleaner cover 9 are attached.

The air blower 3, the engine body 4, etc. are installed on the frame 2. The frame 2 includes a shouldered portion 2a and a bottom surface portion 2b. The shouldered portion 2a is a member which is shouldered by the operator and opposes a back of the operator. A shouldering band (not illustrated) is attached to the shouldered portion 2a such that the shouldered portion 2a is shouldered by the operator. The bottom surface portion 2b extends rearward from a lower end portion of the shouldered portion 2a. The air blower 3, etc. is placed on the bottom surface portion 2b.

The air blower 3 generates a wind by being driven by the engine body 4. The air blower 3 includes a fan that generates a wind and a fan case 3a that covers the fan. The fan is driven to rotate by the engine body 4. An axis of rotation of the fan extends along a front-rear direction. The fan case 3a is fixed to a top surface of the bottom surface portion 2b. The fan case 3a covers the fan by enclosing the fan in the front-rear direction. An external shape of the fan case 3a corresponds to a substantially circular shape to surround the fan when viewed in the front-rear direction.

The wind generated when the fan inside the fan case 3a is driven to rotate is sent out to an outside of the fan case 3a from an air blower outlet 3b provided at a side portion of the fan case 3a on a right side. An intake port for absorbing air into the fan case 3a is provided on a front surface (a surface facing the shouldered portion 2a) of the fan case 3a.

The engine body 4 is disposed adjacent to a rear side of the air blower 3. In other words, an arrangement direction of the air blower 3 and the engine body 4 corresponds to the front-rear direction. Specifically, the engine body 4 is attached to a surface of the fan case 3a on the rear side. An output shaft of the engine body 4 is connected to the fan of the air blower 3. A recoil starter 4a for starting the engine body 4 is attached to the engine body 4. The operator may start the engine body 4 by pulling a knob 4b attached to an end portion of a string of the recoil starter 4a.

The carburetor 5 that supplies an evaporated fuel to the engine body 4 is attached to a side surface of the engine body 4 on a left side. An intake opening for air in the carburetor 5 faces a left side. The engine body 4 and the carburetor 5 are positioned around a center of the fan case 3a when viewed from the rear side along the front-rear direction. Sizes of the engine body 4 and the carburetor 5 are smaller than a size of the fan case 3a when viewed from the rear side along the front-rear direction.

The air cleaner 7 is provided in an upper part of the fan case 3a. The air cleaner 7 removes dust in air supplied to the engine body 4. The backpack type blowing apparatus 1 is used in an outdoor place having a lot of dust in many cases. For this reason, it is preferable to use the air cleaner 7 having a large size to suppress clogging in early stages.

The air cleaner 7 includes an element 7a and an air cleaner box 7b. The air cleaner box 7b is fixed to the upper part of the fan case 3a. The element 7a collects dust in air that passes therethrough, and covers an opening at an inlet side provided in an upper part of the air cleaner box 7b. Air absorbed into the air cleaner box 7b through the element 7a is sent to the engine body 4 side through an air cleaner outlet 7c provided in the air cleaner box 7b. The air cleaner outlet 7c is provided on a rear side of the air cleaner box 7b, and faces the engine body 4 side. The air cleaner outlet 7c serves as a connection port connected to the intake pipe 6.

The intake pipe 6 connects the air cleaner 7 to the carburetor 5, and guides air absorbed into the air cleaner 7 to the carburetor 5. More specifically, the intake pipe 6 includes a carburetor connecting portion 6a connected to the air intake opening of the carburetor 5, an air cleaner connecting portion 6c connected to the air cleaner outlet 7c of the air cleaner 7, and an intermediate portion 6b that connects the carburetor connecting portion 6a to the air cleaner connecting portion 6c. In the present embodiment, the intake pipe 6 is formed using resin.

An end portion of the intake pipe 6 on the air cleaner 7 side is fixed to the air cleaner 7 when the air cleaner connecting portion 6c is fastened by a band 7d put into the air cleaner outlet 7c. An end portion of the intake pipe 6 on the carburetor 5 side is fixed to the carburetor 5 when the carburetor connecting portion 6a is fastened by a band 5a put into the air intake opening of the carburetor 5.

The intake pipe 6 is curved along the external shape of the fan case 3a while being directed to the carburetor 5 from the air cleaner 7 when viewed from the rear side along the front-rear direction.

The top cover 8 is fixed to the fan case 3a to cover at least a portion of the intake pipe 6 and a portion of the engine body 4 from the rear side by interposing the portions between the top cover 8 and the fan case 3a. Referring to the intake pipe 6, a portion of the intermediate portion 6b and the air cleaner connecting portion 6c are covered with the top cover 8. An upper part of the top cover 8 is formed in a substantially circular arc shape along the external shape of the upper part of the fan case 3a.

The top cover 8 includes a plurality of cover fixing portions 8a fixed to the fan case 3a. In the present embodiment, five cover fixing portions (fixing portions) 8a are provided. Specifically, three cover fixing portions 8a are provided in the upper part of the top cover 8. One cover fixing portion 8a is provided in each of a side portion of the top cover 8 on a right side and a lower end portion of the top cover 8 on a right side. The cover fixing portions 8a have a hole through which a screw (not illustrated) for fixing the top cover 8 to the fan case 3a passes.

A case fixing portion 3c is provided at a position of the fan case 3a facing the cover fixing portions 8a when the top cover 8 is attached. The case fixing portion 3c is formed integrally with the fan case 3a, and has a hole through which the screw for fixing the top cover 8 to the fan case 3a passes. The top cover 8 is overlapped with the fan case 3a from the rear side, and fixed to the fan case 3a by the screw passing, through the holes from the hole of the cover fixing portions 8a toward the hole of the case fixing portion 3c.

Herein, an outer circumferential-side fixed portion X positioned on an outer circumferential side of the intake pipe 6 in the fan case 3a is included in the five cover fixing portions 8a provided in the top cover 8 when viewed from the rear side along the front-rear direction. In the present embodiment, among the three cover fixing portions 8a provided in the upper part of the top cover 8, a leftmost cover fixing portion 8a is positioned on an outer circumferential side of the intermediate portion 6b of the intake pipe 6 in the fan case 3a, and this cover fixing portion 8a serves as the outer circumferential-side fixed portion X.

In addition, as illustrated in FIG. 3, a portion from a region of the intermediate portion 6b of the intake pipe 6 adjacent to the outer circumferential-side fixed portion X to a region on the air cleaner connecting portion 6c side when viewed from the rear side along the front-rear side is positioned on an inner side of an outer circumferential portion of the fan case 3a in the fan case 3a.

The air cleaner cover 9 covers the air cleaner 7 from above. The air cleaner cover 9 is fixed to the air cleaner box 7b by a bolt 9a.

The fuel tank 10 is disposed below the engine body 4, and fixed to an upper surface of the bottom surface portion 2b. A liquid fuel inside the fuel tank 10 is supplied to the carburetor 5. A tank depression 10a depressed toward a front side is provided on a surface of the fuel tank 10 on the rear side. The tank depression 10a is positioned in a lower part on the surface of the fuel tank 10 on the rear side. When the tank depression 10a is provided, the upper surface of the bottom surface portion 2b is exposed. In this way, when the operator starts the engine body 4, the operator may press (step on) the upper surface of the bottom surface portion 2b exposed by providing the tank depression 10a using a foot, thereby pulling the knob 4b while the backpack type blowing apparatus 1 is fixed.

A proximal end portion 11b of the blast pipe 11 is connected to the air blower outlet 3b of the fan case 3a. The blast pipe 11 extends forward from the air blower outlet 3b of the air blower 3 through a right side of the frame 2. Air sent out from the air blower outlet 3b of the air blower 3 is spouted out of a proximal end portion 11a of the blast pipe 11 through the blast pipe 11. A grip 11c held by the operator is provided in the blast pipe 11.

The present embodiment is configured as described above, and the intake pipe 6 in the backpack type blowing apparatus 1 is covered with the top cover 8 from the rear side by being interposed between the fan case 3a and the top cover 8. For this reason, it is possible to prevent the intake pipe 6 from directly crashing into an obstacle, and to prevent damage to the intake pipe 6.

In addition, the outer circumferential-side fixed portion X positioned on the outer circumferential side of the intake pipe 6 in the fan case 3a is included in the plurality of cover fixing portions 8a in the top cover 8. In other words, the outer circumferential-side fixed portion X of the top cover 8 is fixed to the fan case 3a at a position on the outer circumferential side of the intake pipe 6 in the fan case 3a. For this reason, even when an external impact is applied to the top cover 8, the impact applied to the top cover 8 may be stopped at the outer circumferential-side fixed portion X positioned on an outer side of the intake pipe 6. In this way, it is possible to strongly protect the intake pipe 6 from an external impact, and to prevent damage to the intake pipe 6.

The portion from the region of the intermediate portion 6b of the intake pipe 6 adjacent to the outer circumferential-side fixed portion X to the region on the air cleaner connecting portion 6c side when viewed from the rear side along the front-rear side is positioned on the inner side of the outer circumferential portion of the fan case 3a in the fan case 3a. In this case, since the outer circumferential portion of the fan case 3a is positioned on an outer side, an obstacle is inhibited from crashing into the portion from the region of the intermediate portion 6b adjacent to the outer circumferential-side fixed portion X to the region on the air cleaner connecting portion 6c side (through the top cover 8). In this way, damage to the intake pipe 6 may be further prevented.

In the present embodiment, a circumference of the carburetor connecting portion 6a of the intake pipe 6 is not covered with the top cover 8. However, since a portion not covered with the top cover 8 (the circumference of the carburetor connecting portion 6a) is close to a portion fixed to the carburetor 5, even when an obstacle crashes into this portion, a wobble, etc. is suppressed, and damage to the carburetor connecting portion 6a may be suppressed.

The air cleaner outlet 7c of the air cleaner 7 faces the engine body 4 side. In this case, the intake pipe 6 may be disposed while being inhibited from passing through an outer side of the fan case 3a when viewed along the front-rear direction. In this way, damage to the intake pipe 6 may be further prevented.

The top cover 8 covers at least the portion of the intake pipe 6 and the portion of the engine body 4 from the rear side. In this way, the top cover 8 may be used to function both as a cover that covers the portion of the intake pipe 6 and a cover that covers the engine body 4.

Hereinbefore, the embodiment of the disclosure has been described. However, the disclosure is not restricted to the above-described embodiment. For example, the cover fixing portions 8a of the top cover 8 may be fixed to the case fixing portion 3c of the fan case 3a using a component other than the screw. In addition, even though one outer circumferential-side fixed portion X is positioned on the outer side of the intake pipe 6 in the present embodiment, a plurality of outer circumferential-side fixed portions X may be provided.

The portion from the region of the intermediate portion 6b of the intake pipe 6 adjacent to the outer circumferential-side fixed portion X to the region on the air cleaner connecting portion 6c side when viewed from the rear side along the front-rear side may not be positioned on the inner side of the outer circumferential portion of the fan case 3a in the fan case 3a. in addition, the air cleaner outlet 7c of the air cleaner 7 may not face the engine body 4 side.

What is claimed is:

1. A backpack type blowing apparatus installed on a frame while an air blower and an engine body driving the air blower are adjacent to each other, the backpack type blowing apparatus comprising:
    an intake pipe that connects an air cleaner fixed to a fan case of the air blower to a carburetor that supplies an evaporated fuel to the engine body; and
    a cover fixed to the fan case to cover at least the intake pipe by interposing the intake pipe between the cover and the fan case,
    wherein the cover has a plurality of fixed portions fixed to the fan case, and
    an outer circumferential-side fixed portion positioned on an outer circumferential side of the intake pipe in the fan case when viewed along an arrangement direction of the air blower and the engine body is included in the plurality of fixed portions.

2. The backpack type blowing apparatus according to claim 1,
    wherein the intake pipe has an air cleaner connecting portion connected to the air cleaner, a carburetor connecting portion connected to the carburetor, and an intermediate portion that connects the air cleaner connecting portion to the carburetor connecting portion, and
    a portion from a region of the intermediate portion adjacent to the outer circumferential-side fixed portion to a region on a side of the air cleaner connecting portion when viewed along the arrangement direction of the air blower and the engine body is positioned on an inner side of an outer circumferential portion of the fan case in the fan case.

3. The backpack type blowing apparatus according to claim 1, wherein a connection port connected to the intake pipe in the air cleaner faces a side of the engine body.

4. The backpack type blowing apparatus according to claim 1, wherein the cover further covers the engine body.

* * * * *